(12) United States Patent
Kawai et al.

(10) Patent No.: US 8,660,725 B2
(45) Date of Patent: Feb. 25, 2014

(54) CONTROL DEVICE OF HYBRID VEHICLE AND HYBRID VEHICLE

(75) Inventors: Takashi Kawai, Gotemba (JP); Naoki Asai, Susono (JP)

(73) Assignee: Toyota Jidosha Kabushiki Kaisha, Toyota (JP)

(\*) Notice: Subject to any disclaimer, the term of this patent is extended or adjusted under 35 U.S.C. 154(b) by 1180 days.

(21) Appl. No.: 12/227,375

(22) PCT Filed: Apr. 27, 2007

(86) PCT No.: PCT/JP2007/059561
§ 371 (c)(1),
(2), (4) Date: Nov. 14, 2008

(87) PCT Pub. No.: WO2007/141984
PCT Pub. Date: Dec. 13, 2007

(65) Prior Publication Data
US 2009/0240387 A1    Sep. 24, 2009

(30) Foreign Application Priority Data
Jun. 7, 2006  (JP) .................... 2006-158655

(51) Int. Cl.
*B60L 11/00* (2006.01)
*B60K 6/20* (2007.10)

(52) U.S. Cl.
USPC ........................... 701/22; 180/65.21

(58) Field of Classification Search
USPC ............ 701/22, 83, 84, 70, 490; 180/65.245, 180/65.275, 165, 65.1–65.8, 65.21; 903/930; 290/40 C; 477/3, 2; 340/995.1, 995.19
See application file for complete search history.

(56) References Cited

U.S. PATENT DOCUMENTS

| | | | |
|---|---|---|---|
| 5,713,814 | A | 2/1998 | Hara et al. |
| 6,336,889 | B1 | 1/2002 | Oba et al. |
| 6,553,287 | B1 | 4/2003 | Supina et al. |
| 2005/0211479 | A1 | 9/2005 | Tamor |
| 2006/0180363 | A1* | 8/2006 | Uchisasai et al. ............ 180/65.2 |
| 2008/0224478 | A1* | 9/2008 | Tamor ......................... 290/40 C |
| 2011/0071716 | A1* | 3/2011 | Gray, Jr. ......................... 701/22 |

FOREIGN PATENT DOCUMENTS

| | | |
|---|---|---|
| JP | A-05-059973 | 3/1993 |
| JP | A-11-165566 | 6/1999 |
| JP | A-11-205907 | 7/1999 |
| JP | A-2000-204999 | 7/2000 |
| JP | A-2000-303873 | 10/2000 |

(Continued)

OTHER PUBLICATIONS

Office Action issued on Dec. 8, 2009 in Japanese Patent Application No. 520465/2008 (with English translation).

(Continued)

*Primary Examiner* — Muhammad Shafi
(74) *Attorney, Agent, or Firm* — Oliff, PLC (57) ABSTRACT

A hybrid vehicle includes a motor generator used for driving the vehicle, an engine used in combination with the motor generator, an accelerator sensor arranged in an instructing unit instructing increase and decrease in required drive torque, and a control device starting the engine when a required engine output value exceeds a start threshold. The controller decreases the start threshold according to at least increase in required drive torque, and preferably decreases the start threshold further according to decrease in vehicle speed sensed by a vehicle speed sensor.

15 Claims, 8 Drawing Sheets

(56) References Cited

FOREIGN PATENT DOCUMENTS

| JP | A-2003-343304 | 12/2003 |
| JP | A-2004-100577 | 4/2004 |
| JP | A-2005-163551 | 6/2005 |

OTHER PUBLICATIONS

European Search Report issued in Application No. 07742996.7; Dated May 6, 2011.

* cited by examiner

CONTROL DEVICE OF HYBRID VEHICLE AND HYBRID VEHICLE

TECHNICAL FIELD

The invention relates to a control device of a hybrid vehicle and a hybrid vehicle, and particularly to start control of an engine.

BACKGROUND ART

In recent years, attention has been given to hybrid vehicles that use an engine and an electric motor in combination. The hybrid vehicle can run using only an electric motor without using an engine and thus can perform EV drive when a battery is in a sufficiently charged state.

Japanese Patent Laying-Open No. 2003-343304 has disclosed a hybrid vehicle in which an engine starts when a large change occurs in accelerator position during EV driving. This can increases an acceleration response.

In a certain hybrid vehicle that has been studied, a battery has a large capacity and is externally chargeable so that an engine operation ratio can be low and refueling is less required. This kind of vehicle is referred to as an "externally chargeable hybrid vehicle" in this description.

As compared with an ordinary hybrid vehicle allowing only refueling, the externally chargeable hybrid vehicle has a battery of a higher output and a higher capacity for increasing an EV drive region so that the EV drive is positively performed when stored electricity is left in the battery. Thereby, it is intended to reduce the fuel consumption and an amount of carbon dioxide emissions.

For example, a user who uses the externally chargeable hybrid vehicle for going a relatively short distance to work may charge a battery every night at home. In this case, the engine starts only when the quantity of stored electricity in the battery becomes substantially zero during a weekend long-distance drive, or a driver depresses an accelerator pedal to increase a load of the vehicle from a small load.

For increasing the effect of reducing the amount of carbon dioxide emissions in the externally chargeable hybrid vehicle, it is necessary to use the battery power with a higher priority than the fuel, as compared with the ordinary hybrid vehicle. However, when a higher priority is assigned to the use of the battery power, the acceleration response may deteriorate. Description will now be given on the deterioration of the acceleration response.

Figure 14:
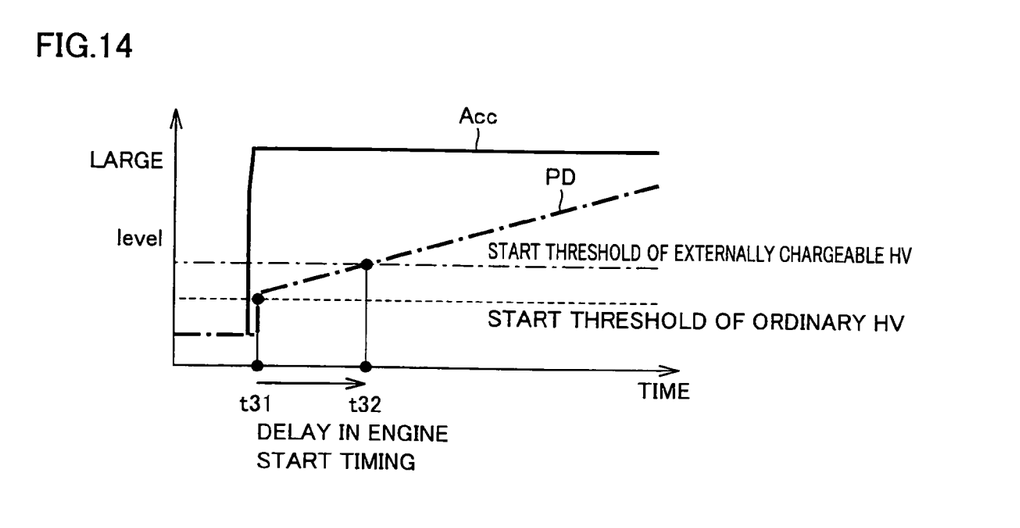
FIG. 14 is a waveform diagram for illustrating an example of deterioration of an acceleration response.

FIG. 14 is a waveform diagram for illustrating an example in which the acceleration response deteriorates.

As shown in FIG. 14, a threshold of engine start is set with respect to a required drive output PD (i.e., a power required for driving a vehicle). Thus, when required drive output PD increases to or above a high load exceeding the threshold, the engine starts.

For using the battery power on a priority basis as compared with the ordinary hybrid vehicle, the start threshold of the required drive output may be set as illustrated in FIG. 14 for starting the engine when the vehicle load increases. Thus, the start threshold of the required drive output starting the externally chargeable hybrid vehicle may be increased as compared with that of the ordinary hybrid vehicle so that for retarding the start of the engine.

However, in the vehicle having the threshold thus changed, the engine start will be delayed from time t31 to time t32 when a high load is suddenly required during a low speed driving, e.g., in an operation of fully accelerating the vehicle from a stopped state.

Even when an accelerator position Acc becomes maximum, required drive output PD does not immediately increase above the threshold. This is because required drive output PD depends on a product of the required drive torque primarily determined based on accelerator position and a vehicle speed. Therefore, when the vehicle speed is low even though the accelerator position Acc becomes maximum, required drive output PD does not exceed the threshold so that the engine start is delayed until the vehicle speed increases.

This phenomenon slows the response to a user's acceleration request. However, it is not preferable that the externally chargeable hybrid vehicle has a remarkably slow acceleration response as compared with the ordinary hybrid vehicle.

DISCLOSURE OF THE INVENTION

An object of the invention is to provide a control device of a hybrid vehicle and the hybrid vehicle that can keep the acceleration response and can also reduce the fuel consumption.

In summary, the invention provides a control device of a hybrid vehicle using an engine and an electric motor in combination, and the control device includes an instructing unit instructing increase and decrease in required drive torque and a control unit starting the engine when a required engine output value exceeds a start threshold. The control unit decreases the start threshold at least according to increase in required drive torque.

Preferably, the control device of the hybrid vehicle further includes a vehicle speed detecting unit detecting a vehicle speed. The control unit decreases the start threshold further according to decrease in vehicle speed detected by the vehicle speed detecting unit.

Preferably, the control unit changes the start threshold further according to a quantity of residual electricity in an electric power storage device mounted on the hybrid vehicle.

Preferably, the control unit calculates a required drive output based on a vehicle speed and the required drive torque, and calculates the required engine output value based on the required drive output and a quantity of residual electricity in an electric power storage device mounted on the hybrid vehicle.

Preferably, the control unit determines a reference value of the start threshold based on a vehicle speed, and calculates the start threshold by adding, to the reference value, a value obtained by multiplying an increment depending on a quantity of residual electricity in an electric power storage device mounted on the hybrid vehicle by a reduction rate determined based on a vehicle speed and the required drive torque.

Preferably, the hybrid vehicle has, as operation modes, an HV mode for controlling charge and discharge with respect to an electric power storage device such that a quantity of residual electricity in the electric power storage device may not deviate from a target value to a large extent, and an EV mode for causing the electric power storage device to perform primarily the discharge without setting a target value of a quantity of stored electricity. The control unit determines the operation mode based on the quantity of the residual electricity in the electric power storage device. The control unit uses a reference value as the start threshold in the HV mode and uses in the EV mode a value obtained by adding a value decreasing with increase in the required drive torque to the reference value as the start threshold.

Further preferably, the control unit controls, in the HV mode, charge and discharge with respect to the electric power storage device to keep the quantity of the residual electricity within a range between predetermined maximum and minimum values. The control unit changes the operation mode from the EV mode to the HV mode when the quantity of the residual electricity becomes smaller than a predetermined value.

According to another aspect, the invention provides a hybrid vehicle including a motor used for driving the vehicle, an engine used in combination with the motor, an instructing unit instructing increase and decrease in required drive torque; and a control unit starting the engine when a required engine output value exceeds a start threshold. The control unit decreases the start threshold at least according to increase in the required drive torque.

Preferably, the hybrid vehicle further includes an electric power storage device supplying an electric power to the motor, and a charging port for charging the electric power storage device from an outside of the vehicle.

Preferably, the hybrid vehicle further includes a vehicle speed detecting unit detecting a vehicle speed. The control unit decreases the start threshold further according to decrease in vehicle speed detected by the vehicle speed detecting unit.

Preferably, the control unit changes the start threshold further according to a quantity of residual electricity in an electric power storage device mounted on the hybrid vehicle.

Preferably, the control unit calculates a required drive output based on a vehicle speed and the required drive torque, and calculates the required engine output value based on the required drive output and a quantity of residual electricity in an electric power storage device mounted on the hybrid vehicle.

Preferably, the control unit determines a reference value of the start threshold based on a vehicle speed, and calculates the start threshold by adding, to the reference value, a value obtained by multiplying an increment depending on a quantity of residual electricity in an electric power storage device mounted on the hybrid vehicle by a reduction rate determined based on a vehicle speed and the required drive torque.

Preferably, the hybrid vehicle has, as operation modes, an HV mode for controlling charge and discharge with respect to an electric power storage device such that a quantity of residual electricity in the electric power storage device may not deviate from a target value to a large extent, and an EV mode for causing the electric power storage device to perform primarily the discharge without setting a target value of a quantity of stored electricity. The control unit determines the operation mode based on the quantity of the residual electricity in the electric power storage device. The control unit uses a reference value as the start threshold in the HV mode and uses in the EV mode a value obtained by adding a value decreasing with increase in the required drive torque to the reference value as the start threshold.

Further preferably, the control unit controls, in the HV mode, charge and discharge with respect to the electric power storage device to keep the quantity of the residual electricity within a range between predetermined maximum and minimum values. The control unit changes the operation mode from the EV mode to the HV mode when the quantity of the residual electricity becomes smaller than a predetermined value.

According to the invention, the electric power of the battery is used as much as possible to reduce fuel consumption without impairing the acceleration response in the hybrid vehicle.

BEST MODES FOR CARRYING OUT THE INVENTION

Embodiments of the invention will now be described with reference to the drawings. In the figures, the same or corresponding parts bear the same reference numbers, and description thereof is not repeated.

First Embodiment

Figure 1:
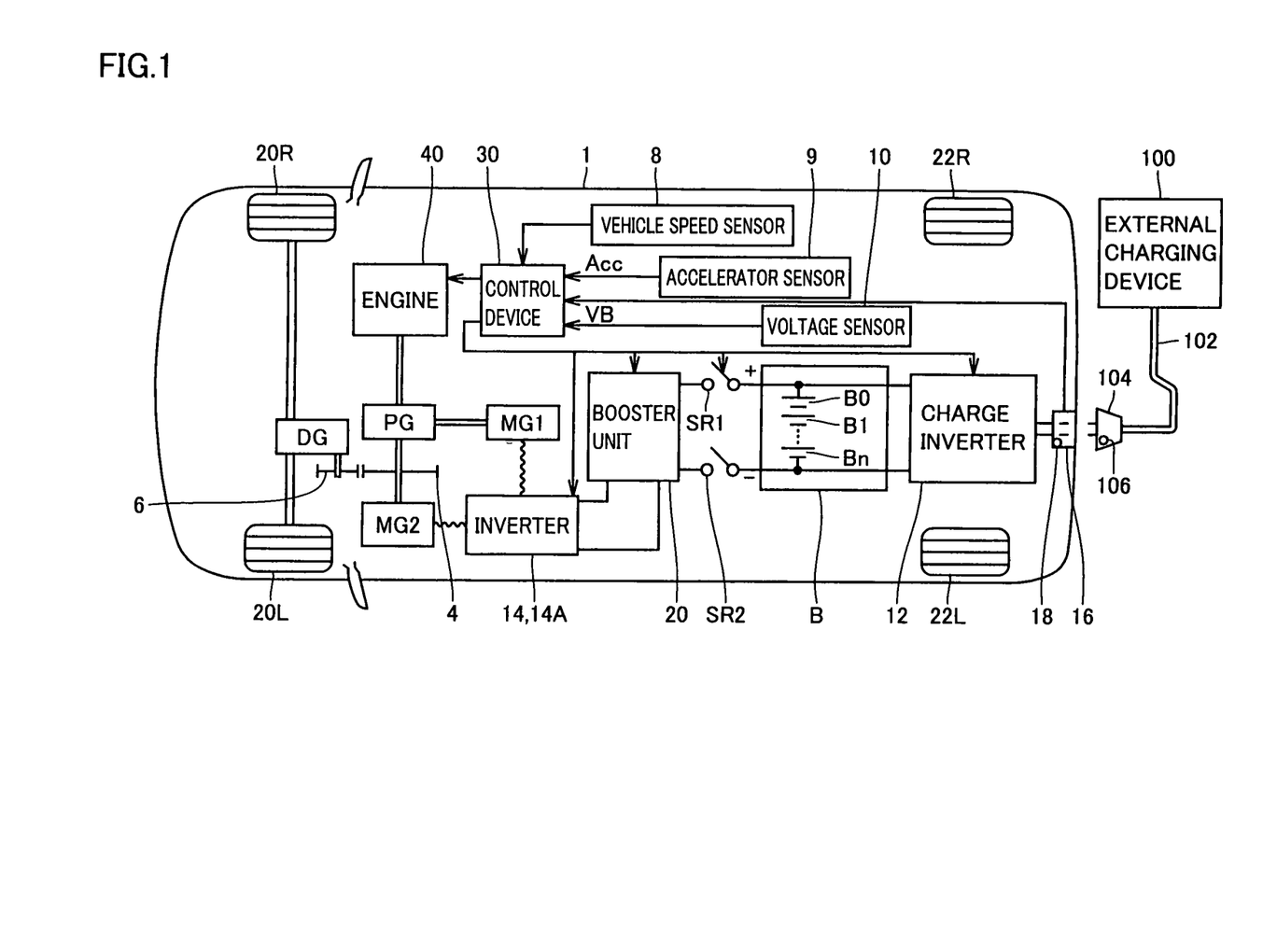
FIG. 1 is a block diagram showing a structure of a hybrid vehicle 1 according to an embodiment of the invention.

FIG. 1 is a block diagram showing a structure of a hybrid vehicle 1 according to an embodiment of the invention.

Referring to FIG. 1, hybrid vehicle 1 includes front wheels 20R and 20L, rear wheels 22R and 22L, an engine 40, a planetary gear PG, a differential gear DG and gears 4 and 6.

Hybrid vehicle 1 further includes a battery B, a booster unit 20 boosting a voltage of a DC power provided from battery B, and inverters 14 and 14A supplying and receiving the DC power to/from booster unit 20.

Hybrid vehicle 1 further includes a motor generator MG1 receiving a power of engine 40 via planetary gear PG and generating an electric power, and a motor generator MG2 having a rotation shaft connected to planetary gear PG. Inverters 14 and 14A are connected to motor generators MG1 and MG2 for performing conversion between the AC powers and the DC powers provided from the booster circuit.

Planetary gear PG includes a sun gear, a ring gear, pinion gears meshing with the sun gear and the ring gear, and a planetary carrier rotatably carrying the pinion gears around the sun gear. Planetary gear PG has first to third rotation shafts. The first rotation shaft is a rotation shaft of the planetary carrier connected to engine 40. The second rotation shaft is a rotation shaft of the sun gear connected to motor generator MG1. The third rotation shaft is a rotation shaft of the ring gear connected to motor generator MG2.

Gear 4 is fixed to the third rotation shaft, and drives gear 6 to transmit a mechanical power to differential gear DG. Differential gear DG transmits the mechanical power received from gear 6 to front wheels 20R and 20L, and also transmits a rotational force of front wheels 20R and 20L via gears 6 and 4 to the third rotation shaft of planetary gear PG.

Planetary gear PG serves to split the power between engine 40 and motor generators MG1 and MG2. More specifically, planetary gear PG determines the rotation of one of the three rotation shafts depending on the rotations of the other two rotation shafts. Therefore, engine 40 is operated in a region achieving the highest efficiency and, at the same time, the vehicle speed is controlled by controlling the quantity of power generated by motor generator MG1 and driving motor generator MG 2. Thereby, the automobile having high energy efficiency as a whole is implemented.

Battery B that is a DC power supply is formed of a secondary battery such as a nickel hydrogen battery, a lithium ion battery or a lead acid battery. Battery B supplies the DC power to booster unit 20, and is charged with the DC power supplied from booster unit 20.

Booster unit 20 boosts the DC voltage received from battery B, and supplies the boosted DC voltage to inverters 14 and 14A. Inverter 14 converts the supplied DC voltage into an AC voltage. In an engine starting operation, inverter 14 drives and controls motor generator MG1. After the engine starts, inverter 14 converts the AC power generated by motor generator MG1 into a DC, which is changed by booster unit 20 into a voltage appropriate for charging battery B. Thereby, battery B is charged.

Inverter 14A drives motor generator MG2. Motor generator MG2 assists engine 40 to drive front wheels 20R and 20L, or drives front wheels 20R and 20L by itself In a braking operation, motor generator MG2 performs a regenerative operation to convert a rotational energy of the wheels into an electric energy. The electric energy thus obtained is supplied to battery B via inverter 14A and booster unit 20.

Battery B is a battery set, and includes a plurality of battery units B0-Bn connected in series together. System main relays SR1 and SR2 are arranged between booster unit 20 and battery B for interrupting a high voltage when the vehicle is not operating.

Hybrid vehicle 1 further includes a vehicle speed sensor 8 sensing a vehicle speed, an accelerator sensor 9 sensing a position of an accelerator pedal which is an input unit receiving an acceleration request instruction of a driver, a voltage sensor 10 attached to battery B, a control device 30 controlling engine 40, inverters 14 and 14A, and booster unit 20 according to an accelerator position Acc provided from accelerator sensor 9 and a voltage VB provided from voltage sensor 10. Voltage sensor 10 senses voltage VB of battery B, and transmits it to control device 30.

Hybrid vehicle 1 further includes a socket 16 for connecting a plug 104 arranged at an end of a charge cable 102 extending from an external charging device 100, a coupling check sensor 18 that is arranged on socket 16 for detecting a coupling check element 106 on plug 104 and thereby determining that plug 104 is connected to socket 16, and a charge inverter 12 (i.e., inverter for charging) receiving the AC power from external charging device 100 via socket 16.

Charge inverter 12 is connected to battery B, and supplies a DC power for charging to battery B. Coupling check sensor 18 may take any form. For example, it may be configured to detect a magnet on the plug side, or may take a form having a push-button that is depressed when the plug is fitted, or is configured to detect a connection resistance of the power path.

Figure 2:
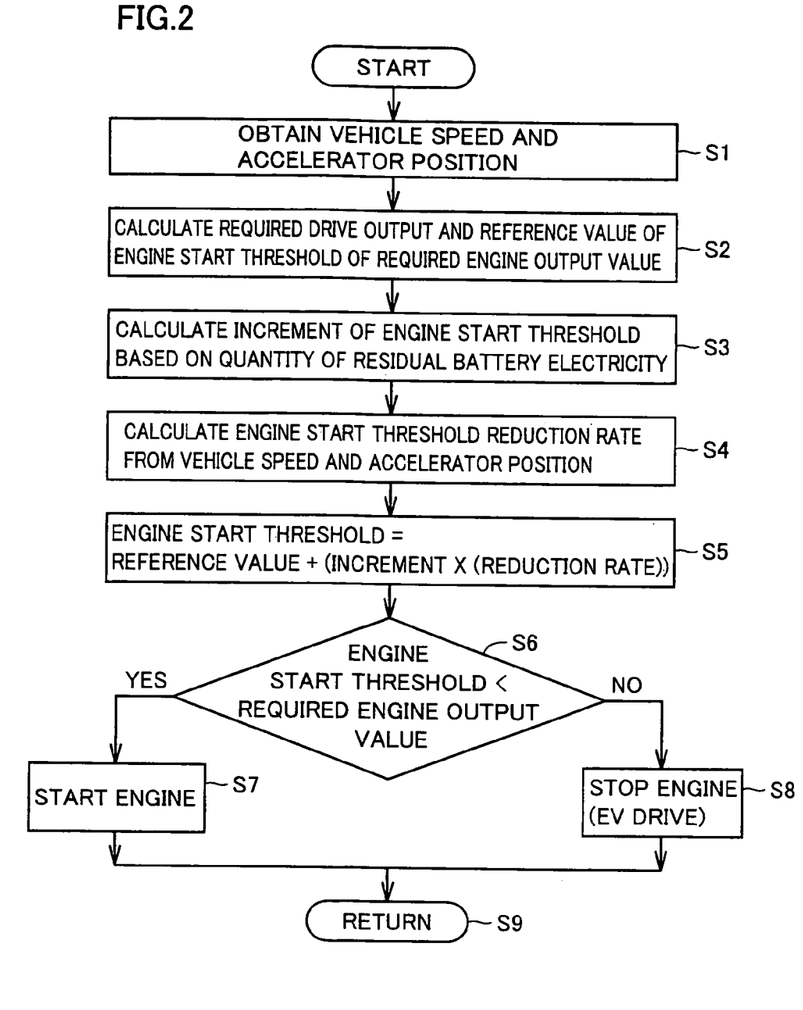
FIG. 2 is a flowchart illustrating a control structure of a program executed for determining engine start by a control device 30 in FIG. 1.

FIG. 2 is a flowchart illustrating a control structure of a program executed when control device 30 in FIG. 1 performs determination about the engine start. Processing in this flowchart is called from a predetermined main routine and is execute at predetermined time intervals or every time predetermined conditions are satisfied.

Referring to FIGS. 1 and 2, when the processing starts, control device 30 obtains a vehicle speed from vehicle speed sensor 8, and also obtains accelerator position Acc from accelerator sensor 9 in step S1. Various kinds of vehicle speed sensors may be used as vehicle speed sensor 8. Also, a resolver detecting a revolution speed of motor generator MG2 that rotates together with the wheels may be used as vehicle speed sensor 8.

Subsequently, control device 30 calculates a required drive output and a reference value of the engine start threshold of the required engine output value in step S2.

The relation between the required drive output and the accelerator position will be successively described below.

Figure 3:
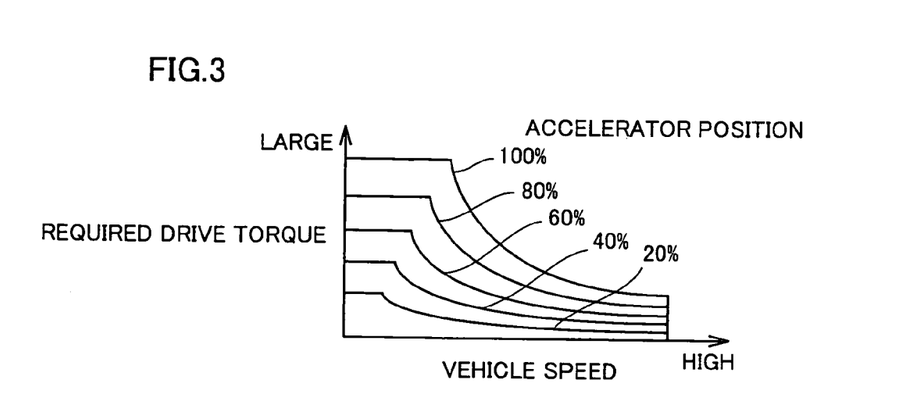
FIG. 3 illustrates an example of a relation among a required drive torque, a vehicle speed and an accelerator position.

FIG. 3 shows an example of the relation among the required drive output, the vehicle speed and the accelerator position.

The required drive torque is a numerical value calculated from the selected gear, the accelerator position and the vehicle speed, and is a torque on the wheel axle required by the user.

As illustrated in FIG. 3, the required drive torque can be set as follows. When the accelerator position is 100% (e.g., when the accelerator pedal is fully depressed) and the vehicle speed is in a low vehicle speed region, the required drive torque attains a large constant value according to the maximum output characteristics of the motor. When the vehicle speed increases from the above region, the required drive torque gradually decreases according to increase in vehicle speed.

The required drive torque can also be set to decrease as represented by curves in FIG. 3 as the accelerator position lowers to 80%, 60%, 40% and 20%.

The required drive output will now be described. The required drive output is an output on the axle calculated from the required drive torque, and is obtained from ((required drive torque)×(axle revolution speed)).

Figure 4:
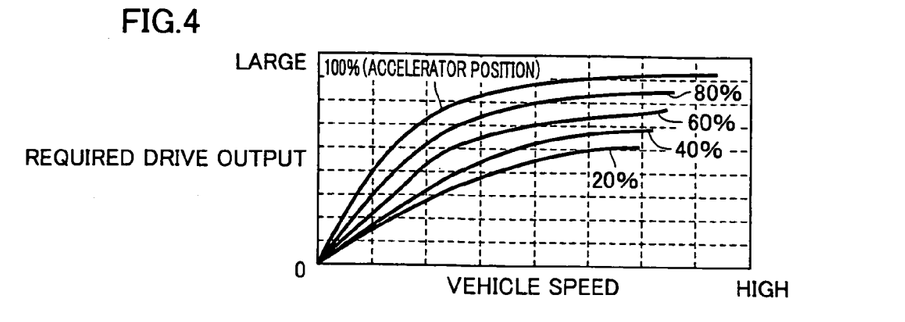
FIG. 4 is a map used for calculating a required drive output in a step S2 in FIG. 2.

FIG. 4 is a map used for calculating the required drive output in step S2 of FIG. 2.

As illustrated in FIG. 4, the required drive output is determined based on the accelerator position and the vehicle Speed. The accelerator position takes values of 100%, 80%, 60%, 40% and 20% in the illustrated representative example, and the required power (required drive output) on the axle with respect to the vehicle speed is illustrated.

When the required drive torque is determined as illustrated in FIG. 3, there is a region where the required drive torque decreases with increase in vehicle speed. However, the required drive torque output takes a value obtained by multiplying the required drive torque by the axle revolution speed so that the required drive output becomes zero when the vehicle speed is zero.

When the accelerator position is constant, the required drive output increases with the vehicle speed. When the vehicle speed is constant, the required drive output increases with the degree of pressing down the accelerator. In the operation mode in which a driver does not operate an accelerator pedal and, e.g., in an automatic cruise mode for constant-speed driving, the accelerator position or the required drive torque that is determined by an electronic control device is used for controlling the vehicle instead of the accelerator position determined by the accelerator pedal.

Figure 5:
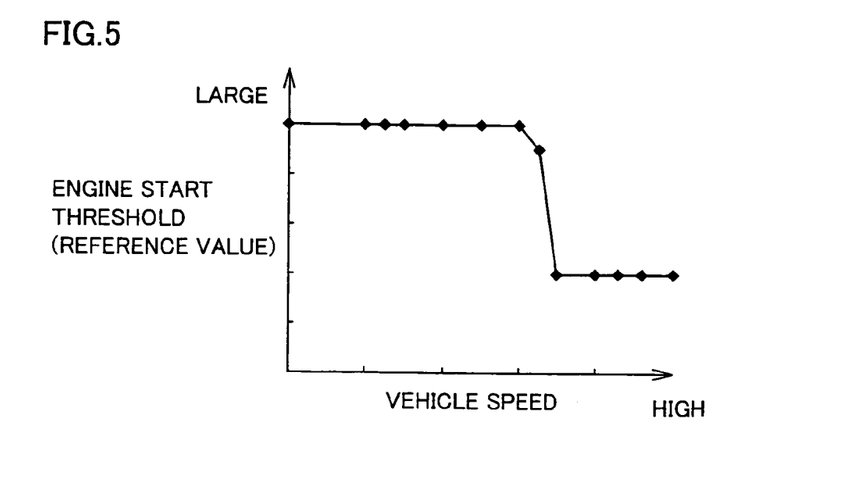
FIG. 5 is a map used for calculating a reference value of an engine start threshold in step S2 of FIG. 2.

FIG. 5 is a map used for calculating the reference value of the engine start threshold of the required engine output value in step S2 of FIG. 2.

Referring to FIG. 5, the reference value of the engine start threshold of the required engine output value is substantially constant until the vehicle speed reaches a certain value, and is set lower when the vehicle speed reaches the certain value. This is for the following reason. When the vehicle speed is high, the energy efficiency of the engine is high so that compulsory execution of the EV driving would lower the energy efficiency. Further, the high vehicle speed increases the required drive output that is required for driving the vehicle so that it is impossible to supply all the required drive output from only the motors in some cases. This is another reason of the above.

Referring to FIGS. 1 and 2 again, when the required drive output and the reference value of the engine start threshold are calculated in step S2, the process proceeds to step S3.

In step S3, control device 30 obtains the increment of the engine start threshold from a quantity of residual electricity in battery B.

Figure 6:
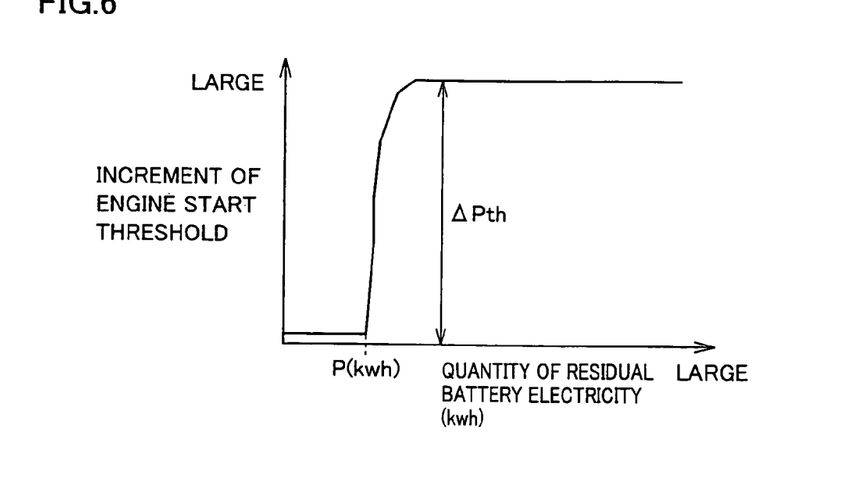
FIG. 6 is a map used for calculating an increment of the engine start threshold in a step S3 of FIG. 2.

FIG. 6 is a map used for calculating the increment of the engine start threshold in step S3 of FIG. 2.

In FIG. 6, the abscissa gives the quantity (kWh) of residual electricity in absolute value. This quantity is different from a state of charge of the battery that is represented in relative percentage, and is used for determining whether a certain quantity of the stored electricity that can drive the vehicle a certain distance is left or not, regardless of the magnitude of the battery capacity.

The ordinate in FIG. 6 gives the increment of the engine start threshold. An increment ΔPth is an increment with respect to the reference value of the engine start threshold determined in FIG. 5, but this increment is not added as it is, but is added in view of a reduction rate which will be described later.

The reference value of the engine start threshold determined in FIG. 5 corresponds to an engine start threshold (a lower threshold in FIG. 14) of an ordinary hybrid vehicle that does not perform external charging. A value obtained by adding the increment to this reference value corresponds to a threshold (an upper threshold in FIG. 14) to be applied to the externally chargeable hybrid vehicle.

Referring to FIGS. 1 and 2 again, when the increment is calculated in step S3, the process proceeds to step S4.

In step S4, control device 30 obtains a reduction rate K of the engine start threshold from the vehicle speed and the accelerator position.

Figure 7:
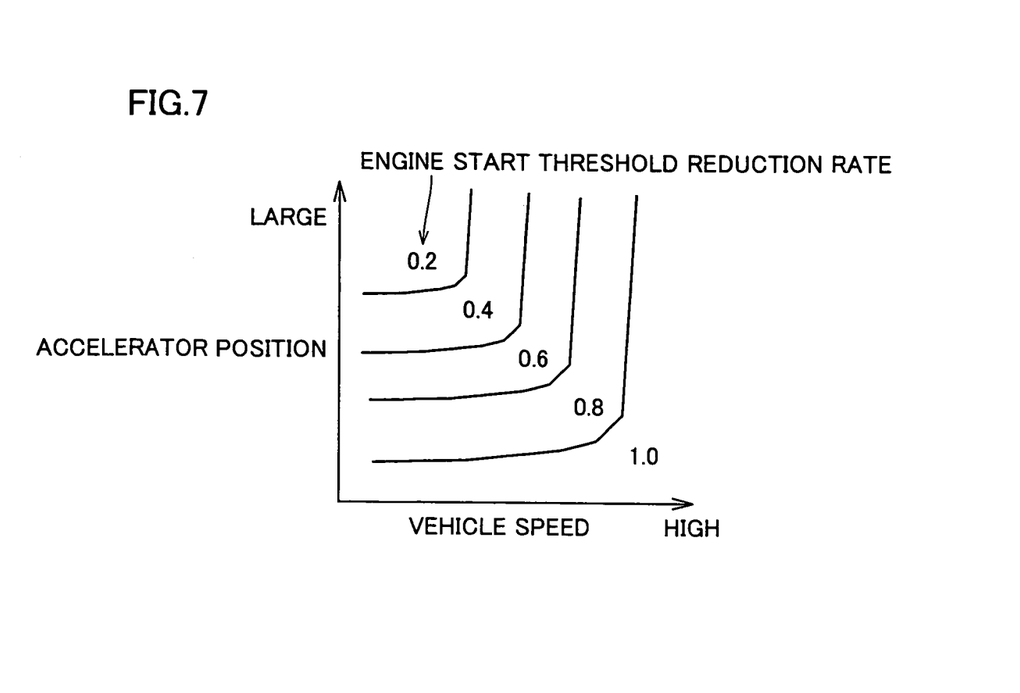
FIG. 7 is a map used for calculating a reduction rate K of the engine start threshold in a step S4 of FIG. 2.

FIG. 7 is a map used for calculating reduction rate K of the engine start threshold in step S4 of FIG. 2.

Referring to FIG. 7, in a region where the accelerator position is large and the vehicle speed is low, reduction rate K of the engine start threshold is equal to 0.2. The increment that will be obtained in step S3 is multiplied by this reduction rate K. Therefore, as reduction rate K decreases, the engine start threshold decreases and approaches the reference value. The decrease in engine start threshold means that the engine is more likely to start when the required drive output increases.

In FIG. 7, when the accelerator position decreases or the vehicle speed increases, reduction rate K of the engine start threshold increases to 1.0 through 0.4, 0.6 and 0.8.

Referring to FIGS. 1 and 2 again, when reduction rate K is calculated in step S4, the process proceeds to step S5.

In step S5, control device 30 calculates the engine start threshold based on the following equation (1), where Pth indicates the engine start threshold, Pth(min) indicates the reference value of the engine start threshold, ΔPth indicates the increment of the engine start threshold and K indicates the reduction rate of the engine start threshold:

$$Pth = Pth(\min) + (\Delta Pth \times K) \quad (1)$$

In step S6, control device 30 adds a required battery charge value, which is required for keeping the battery in a predetermined range of the state of charge, to the required drive output obtained in step S2, and thereby obtains the required engine output value. Thus, the relationship of ((required engine output value)=(required drive output)+(required battery charge value)) is satisfied. The required battery charge value becomes negative when the state of charge of the battery is close to an upper control limit, and becomes positive when it is close to a lower control limit.

Further, in step S6, a comparison in magnitude is performed between the required engine output value and the engine start threshold. When the required engine output value is larger than engine start threshold Pth, the engine starts in step S7. When the required engine output value is lower than or equal to engine start threshold Pth, the EV driving is performed without operating the engine in step S8.

When the processing in step S7 or S8 ends, the control returns to the main routine in step S9.

Figure 8:
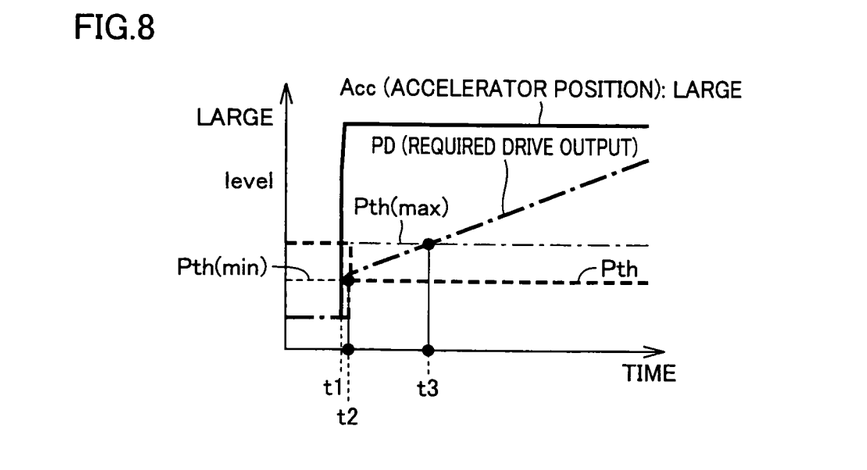
FIG. 8 is a first waveform diagram for illustrating engine start timing in the case where the control of the flowchart of FIG. 2 is performed.

FIG. 8 is a first waveform diagram for illustrating engine start timing in the case where the control of the flowchart in FIG. 2 is performed.

Referring to FIG. 8, description will now be given on the case where the vehicle speed is low and the accelerator position is large. For the sake of simplicity, the following description will be given on the case where the required battery charge value for keeping the battery in the predetermined range of the state of charge is zero and the required engine output value is equal to required drive output PD.

Before time t1, the accelerator position is small so that reduction rate K of the engine start threshold in FIG. 7 is set, e.g., to 1.0. At time t1, therefore, engine start threshold Pth is set to a value Pth(max) obtained by adding the increment itself calculated in step S3 to the reference value calculated in step S2 in FIG. 2.

At time t1, a driver deeply depresses the accelerator pedal so that accelerator position Acc suddenly increases. Thereby, required drive output PD rises in a stepwise fashion at time t2, and thereafter increases further with increase in vehicle speed. In this operation, since the vehicle speed is low and the accelerator position is large, the reduction rate of the engine start threshold illustrated in FIG. 7 is set to the value, e.g., of 0.2, and engine start threshold Pth becomes close to reference value Pth(min).

Thereby, required drive output PD immediately exceeds threshold Pth at time t2. This means that the engine start time is advanced from time t3 to time t2, as compared with the case where the threshold is fixedly increased for application to the externally chargeable hybrid vehicle. Therefore, the engine can start rapidly to accelerate the vehicle with good response to rapid acceleration request by the user.

Figure 9:
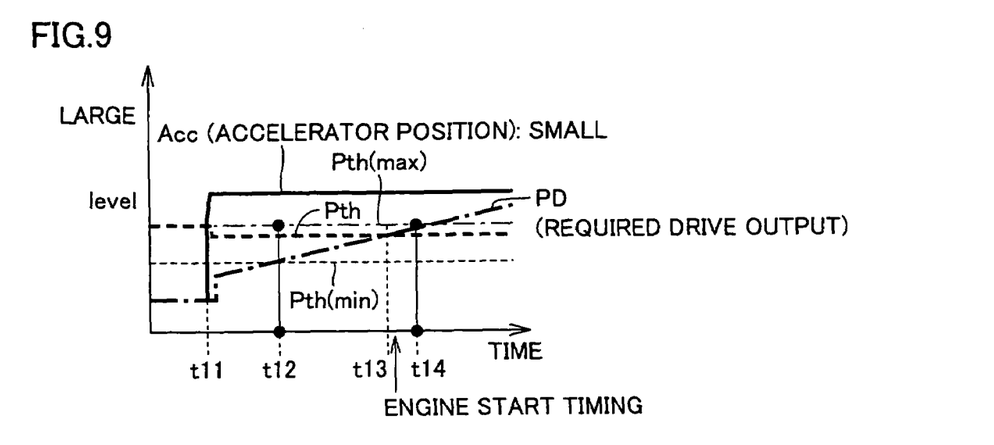
FIG. 9 is a second waveform diagram for illustrating engine start timing in the case where the control of the flowchart of FIG. 2 is performed.

FIG. 9 is a second waveform diagram for illustrating the engine start timing in the case where the control of the flowchart in FIG. 2 is performed. For the sake of simplicity, FIG. 9 and the following description likewise relate to the case where the required battery charge value for keeping the battery in the predetermined range of the state of charge is zero, and the required engine output value is equal to required drive output PD.

Referring to FIG. 9, description will now be given on the case where the vehicle speed is low but the accelerator position is not large. Before time t11, the accelerator position is small so that the reduction rate of the engine start threshold in FIG. 7 is set to, e.g., 1.0. At time t11, therefore, engine start threshold Pth is set to value Pth(max) obtained by adding the increment itself calculated in step S3 of FIG. 2 to the reference value calculated in step S2.

At time t11, the driver slightly depresses the accelerator pedal to increase slightly accelerator position Acc. Thereby, required drive output PD rises in a stepwise fashion, and thereafter gradually increases with increase in vehicle speed. In this operation, the vehicle speed is low and the accelerator position is not large so that the reduction rate of the engine start threshold illustrated in FIG. 7 is set to the value of 0.8, and engine start threshold Pth takes the value slightly lower than Pth(max).

Consequently, required drive output PD exceeds threshold Pth at time t13. When the threshold is fixedly increased for application to the externally chargeable hybrid vehicle, the engine starts at time t14. In the hybrid vehicle not performing the external charging, the engine starts at time t12. In the externally chargeable hybrid vehicle according to the embodiment, the engine starts at time t13 intermediate between them.

When the acceleration request is slow, the engine start time is delayed so that the battery power is consumed and the fuel consumption decreases to produce an effect of reducing an amount of carbon dioxide emissions.

Figure 10:
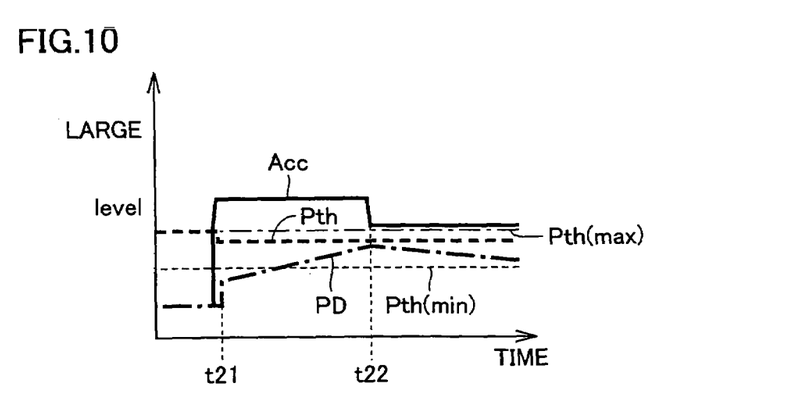
FIG. 10 is a third waveform diagram for illustrating engine start timing in the case where the control of the flowchart of FIG. 2 is performed.

FIG. 10 is a third waveform diagram for illustrating the engine start timing in the case where the control of the flowchart in FIG. 2 is performed.

In a waveform diagram of FIG. 10, accelerator position Acc decreases at time t22. Before time t22, the changes in waveform are the same as those in the waveform diagram of FIG. 9, and therefore description thereof is not repeated. In FIG. 10, accelerator position Acc decreases at time t22 so that required drive output PD that has been increasing starts to decrease at time t22. Therefore, required drive output PD does not reach threshold Pth, and the engine does not start.

As described above, when the acceleration request is slow, and the acceleration request decreases during the acceleration, the engine does not start. Therefore, the power of battery is consumed during the city driving and the like, and the fuel consumption is small. This is further effective at reducing the amount of carbon dioxide emissions.

Based on the above description, the embodiment can be summarized as follows. Hybrid vehicle 1 in FIG. 1 includes motor generator MG2 used for driving the vehicle, engine 40 used in combination with motor generator MG2, accelerator sensor 9 arranged in the instructing unit instructing increase and decrease in required drive torque, and control device 30 starting the engine when the required engine output value exceeds the start threshold. Control device 30 decreases the threshold at least according to increase in required drive torque as can be understood from reduction rate K that changes with the accelerator position in FIG. 7.

Preferably, the hybrid vehicle further includes battery B supplying the electric power to motor generator MG2, and socket 16 for externally charging battery B.

Preferably, hybrid vehicle 1 further includes vehicle speed sensor 8 sensing the vehicle speed. Control device 30 decreases the start threshold according to the decrease in vehicle speed sensed by vehicle speed sensor 8 as can be seen from reduction rate K that changes with the vehicle speed in FIG. 7.

Preferably, control device 30 changes the start threshold further according to the quantity of residual electricity in battery B mounted on hybrid vehicle 1.

Preferably, control device 30 calculates required drive output PD based on the vehicle speed and the required drive torque as illustrated in the map of FIG. 4. As can be seen from increment $\Delta$Pth in FIG. 6, control device 30 calculates the required engine output value based on required drive output PD and the quantity of residual electricity in the electric power storage device mounted on the hybrid vehicle.

Preferably, as illustrated in the flowchart of FIG. 2, control device 30 determines reference value Pth(min) of the start threshold based on the vehicle speed, multiplies increment $\Delta$Pth depending on the quantity of residual electricity in battery B mounted on the hybrid vehicle by reduction rate K that is illustrated in FIG. 7 and depends on the vehicle speed and the required drive torque given by the accelerator position and the like, and then adds the product thus obtained to the reference value to calculate start threshold Pth.

As a result of the engine start control thus performed, when the driver requests rapid acceleration, the engine rapidly starts to satisfy the acceleration request. Also, when the acceleration request of the driver is slow, the engine start is suppressed according to the degree of such slow request. Therefore, the fuel consumption is reduced to produce the effect of reducing the amount of carbon dioxide emissions.

Second Embodiment

The externally chargeable hybrid vehicle positively performs the EV driving when a large quantity of electricity remains in the battery after the charging. The mode for this operation is referred to as an "EV mode". In the EV mode, the discharging of battery primarily takes place, and the battery is charged substantially only when a regenerative power is collected in the braking operation or when a surplus energy of the engine is collected after the engine started for compensating for a shortage in torque in a rapidly accelerating operation.

When the quantity of stored electricity becomes small due to the discharge of the battery, the charge/discharge control of the battery is performed to attain a predetermined target state of charge as is done in the ordinary hybrid vehicle. Thus, engine 4 drives motor generator MG1 to generate the electric power, which in turn drives motor generator MG2. The battery serves as a buffer of the electric power that may temporarily become excessive or short.

Figure 11:
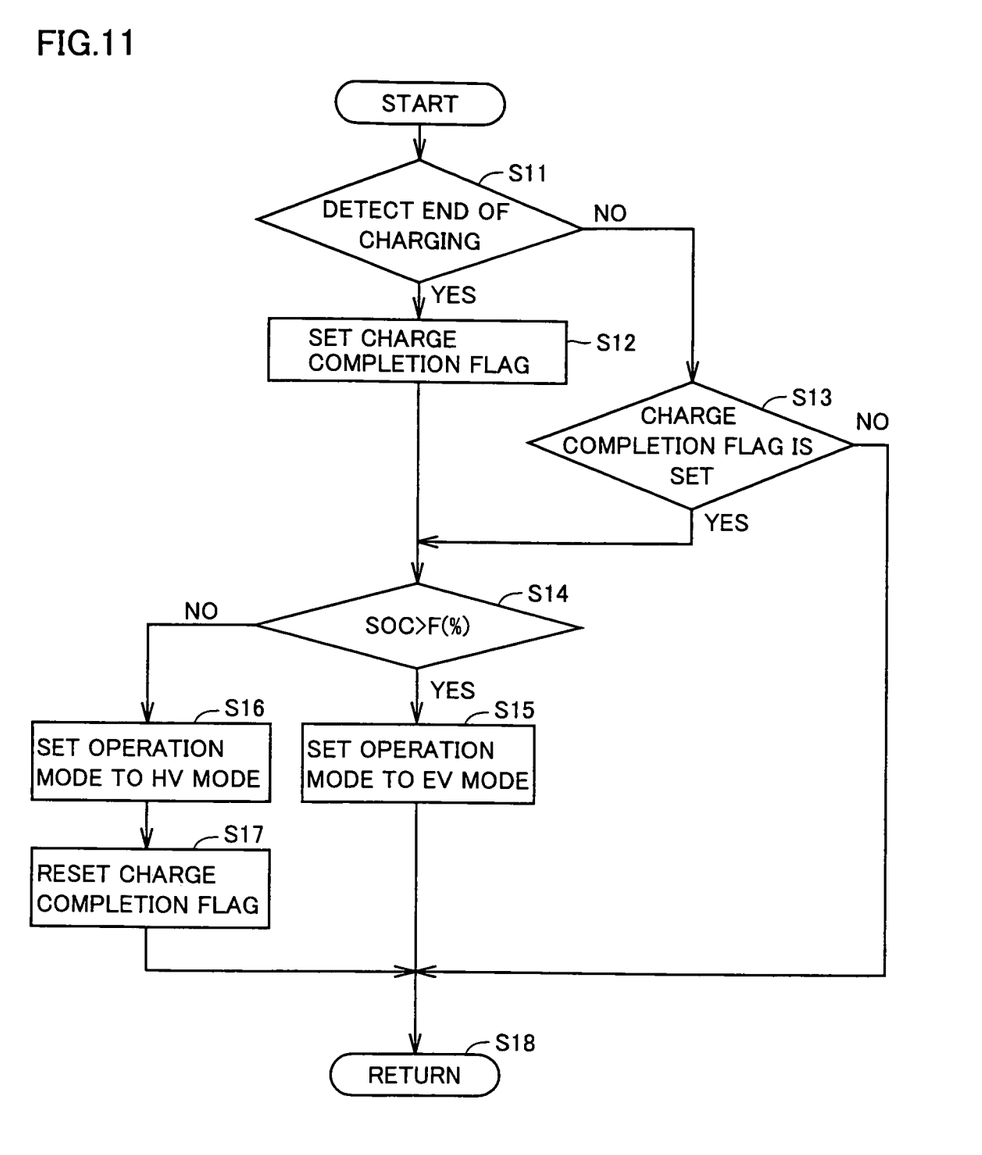
FIG. 11 is a flowchart for illustrating determination of an operation mode in a second embodiment.

FIG. 11 is a flowchart for illustrating the determination of the operation mode in the second embodiment. The processing of this flowchart is called for execution from a predetermined main routine at predetermined time intervals or when a predetermined condition is satisfied. The structure of the vehicle of the second embodiment is substantially the same as that in FIG. 1 of the first embodiment already described, and therefore description thereof is not repeated.

Referring to FIGS. 1 and 11, when the processing starts, it is determined whether the fact that the external charging of the battery is already performed and completed is detected or not. For example, coupling check sensor 18 arranged in socket 16 may detect that the state of plug 104 with respect to socket 16 changed from the connected state to the disconnected state, and thereby the end of the charging may be detected. Such a state may be detected that external charging device 100 stops the power supply to the charge inverter, and thereby the completion of the charging may be detected.

When the end of the charging is detected in step S11, the processing proceeds to step S12, and control device 30 sets a charge completion flag held in an internal memory or the like. Conversely, when the end of the charging is not detected in step S11, the process proceeds to step S13, and control device 30 determines whether the charge completion flag is set or not. In step S13, when the charge completion flag is not set, the process proceeds to step S18, and the control returns to the main routine.

When the charge completion flag is set in step S12, or when the setting of the charge completion flag is detected in step S13, the process proceeds to step S14. In step S14, the state of charge (SOC) of battery B is calculated. The state of charge indicates the quantity of residual electricity in the battery, and is often represented as a percentage (%). The state of charge is calculated by measuring the voltage of battery B, integration of the charge/discharge currents and the like. It is determined whether the state of charge is larger than a predetermined value F(%). When the state of charge is larger than the predetermined value F(%), the battery can be discharged so that the process proceeds to step S15, and control device 30 sets the operation mode to the EV mode.

In step S14, when the state of charge is not larger than predetermined value F(%), the battery must be charged so that the process proceeds to step S16, and control device 30 sets the operation mode to the HV mode. Control device 30 resets the charge completion flag in step S17.

When the processing in step S15 or S17 ends, the process proceeds to step S18, and the control returns to the main routine.

Figure 12:
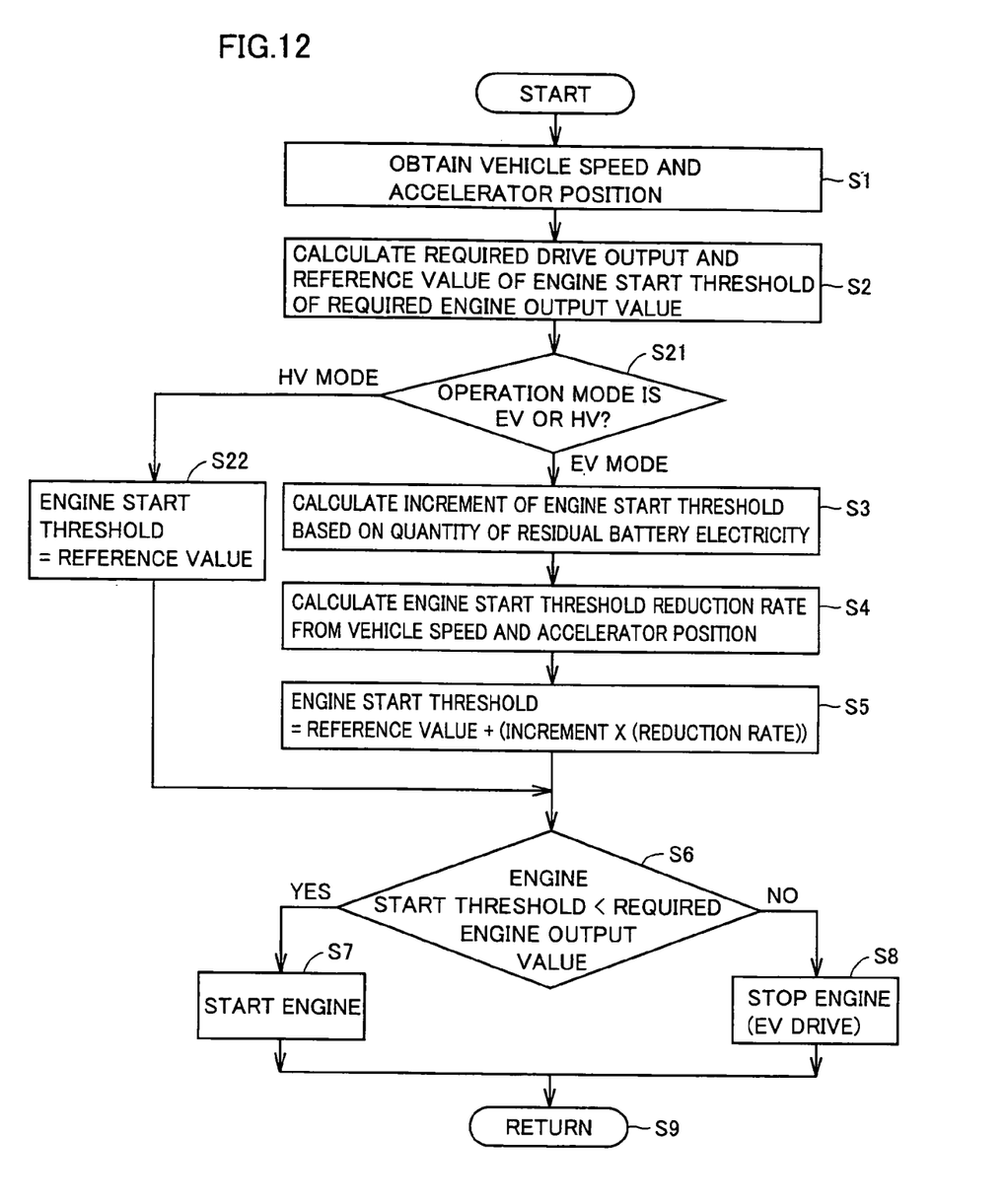
FIG. 12 is a flowchart for illustrating determination of an engine start threshold in the second embodiment.

FIG. 12 is a flowchart for illustrating determination of the engine start threshold in the second embodiment.

The flowchart of FIG. 12 includes processing in steps S21 and S22 in addition to those in the flowchart of FIG. 2 of the first embodiment already described. The processing in the other steps S1-S9 is substantially the same as that in the first embodiment, and therefore description thereof is not repeated.

In the second embodiment, it is determined in step S21 whether the operation mode of the vehicle is the EV mode or the HV mode, after the reference value of the engine start threshold is calculated in step S2.

The operation mode is determined by the processing that is already described with reference to the flowchart of FIG. 11 already described. This can be briefly described as follows. When the fully or nearly fully charged state is kept immediately after the external charging, the operation mode is set to the EV mode. When the battery power is consumed thereafter to exhibit the state of charge not exceeding predetermined value F, the operation mode changes from the EV mode to the HV mode. When the HV mode is once selected, the operation mode will not return to the EV mode until the next external charging is completed.

When the operation mode is the EV mode in step S21, the processing in steps S3-S5 is performed similarly to the first embodiment, and the engine start threshold is set.

When the operation mode is the HV mode in step S21, the processing in steps S3-5 is not performed. In this case, the reference value that is calculated in step S2 is used as the engine start threshold in step S22 as it is.

Figure 13:
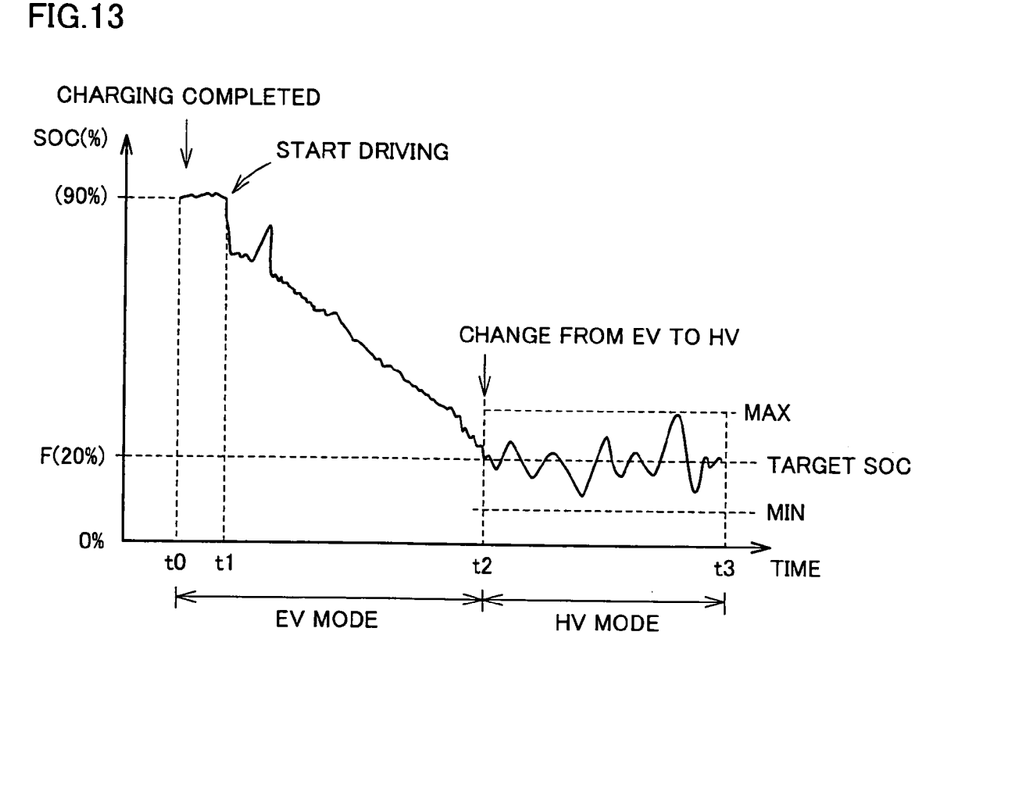
FIG. 13 is a diagram illustrating changes in state of charge as well as switching of the operation mode in the second embodiment.

FIG. 13 illustrates the changes in state of charge and the switching of the operation mode in the second embodiment.

Referring to FIG. 13, external charging device 100 ends the charging of battery B at a user's home or the like at time t0. Thereby, the state of charge attains, e.g., the fully charged state.

When the driving starts at time t1, the vehicle in the EV mode positively uses the power of the battery. In the EV mode, the battery is charged only in restricted situations in which, e.g., the regenerative electric power is collected during a braking operation on a downward slope or the like. Therefore, the state of charge of the battery gradually lowers during times t1 to t2.

In the EV mode, the processing in steps S3-S5 sets the engine start threshold as already described with reference to FIG. 12. Therefore, when the accelerator position is large, the start threshold is set small so that the engine can easily start and can exhibit a good response property. When the vehicle speed lowers, the start threshold is set small so that the engine can easily start and can exhibit a good response property.

During the EV mode, the target value of the quantity of stored electricity of the battery is not set, and the electric power storage device primarily performs the discharge.

When the state of charge reaches predetermined threshold F at time t2, control device 30 changes the operation mode from the EV mode to the HV mode. In the HV mode set between times t2 and t3, control device 30 controls the charging/discharging of the battery so that the quantity of residual electricity in the battery may not significantly deviate from the target value.

More specifically, the amount of generated power of motor generator MG1 and the power consumption of motor generator MG2 are adjusted to keep the state of charge of the battery between maximum and minimum values MAX and MN that are determined on the opposite sides of the target state of charge, respectively.

In FIG. 13, threshold F is equal to the target value of the state of charge, but is not restricted to it. In view of the state immediately after the change to the HV mode, it is desired that threshold F is intermediate between maximum and minimum values MAX and MN.

According to the second embodiment, as described above, control device 30 uses the reference value itself determined in step S2 as the engine start threshold in step S22 when the operation is in the HV mode. When the operation is in the EV mode, control, device 30 adds the value ((increment)×(reduction rate)) that decreases with increase in required drive torque to the reference value in steps S3-S5, and uses the result as the engine start threshold.

Thereby, when the operation is in the EV mode positively using the battery, the processing in steps S3-S5 is executed for enhancing the response property. Further, after the operation changes to the HV mode, the control is changed to a simpler manner and the load on control device 30 is reduced.

The embodiment has been described in connection with the example suitable for the series/parallel-type hybrid system in which a power splitting mechanism splits the power of the engine into those to be transmitted to the axle and the generator, respectively. However, the invention can be applied to the series-type hybrid vehicle in which an engine is used only for driving an electric generator, and only a motor using the power generated by the electric generator generates a drive power of an axle. In the series-type hybrid vehicle, such a situation may occur depending on a quantity of residual electricity that the engine must be started to generate the electric power from the generator during high load driving. Therefore, the invention can be applied to the series-type hybrid vehicle.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A control device of a hybrid vehicle using an engine and an electric motor in combination, comprising:
   an instructing unit configured to instruct increase and decrease in required drive torque, the required drive torque being a function of vehicle speed and accelerator position; and
   a control unit configured to start the engine when a required engine output value exceeds a start threshold for starting the engine, wherein
   the control unit is configured to (i) set the start threshold at a first threshold value when the required drive torque is relatively high and (ii) set the start threshold at a second threshold value that is higher than the first threshold value when the required drive torque is relatively low.

2. The control device of the hybrid vehicle according to claim 1, further comprising:
a vehicle speed sensor that senses a vehicle speed, wherein the control unit decreases the start threshold in accordance with a decrease in the sensed vehicle speed.

3. The control device of the hybrid vehicle according to claim 1, wherein
the control unit changes the start threshold in accordance with a quantity of residual electricity in an electric power storage device mounted on the hybrid vehicle.

4. The control device of the hybrid vehicle according to claim 1, wherein
the control unit calculates a required drive output based on a vehicle speed and the required drive torque, and calculates the required engine output value based on the required drive output and a quantity of residual electricity in an electric power storage device mounted on the hybrid vehicle.

5. The control device of the hybrid vehicle according to claim 1, wherein
the control unit determines a reference value of the start threshold based on a vehicle speed, and calculates the start threshold by adding, to the reference value, a value obtained by multiplying an increment determined based on a quantity of residual electricity in an electric power storage device mounted on the hybrid vehicle by a reduction rate determined based on a vehicle speed and the required drive torque.

6. The control device of the hybrid vehicle according to claim 1, wherein
the hybrid vehicle has, as operation modes, an HV mode for controlling charge and discharge with respect to an electric power storage device such that a quantity of residual electricity in the electric power storage device stays within a predetermined range of a target value, and an EV mode for causing the electric power storage device to perform primarily the discharge without setting the target value of a quantity of stored electricity,
the control unit determines the operation mode based on the quantity of the residual electricity in the electric power storage device, and
the control unit uses a reference value as the start threshold in the HV mode and uses in the EV mode a value obtained by adding a value that decreases with increase in the required drive torque to the reference value as the start threshold.

7. The control device of the hybrid vehicle according to claim 6, wherein
the control unit controls, in the HV mode, charge and discharge with respect to the electric power storage device to keep the quantity of the residual electricity within a range between predetermined maximum and minimum values, and
the control unit changes the operation mode from the EV mode to the HV mode when the quantity of the residual electricity becomes smaller than a predetermined value.

8. A hybrid vehicle comprising:
a motor used for driving the vehicle;
an engine used in combination with the motor;
an instructing unit configured to instruct increase and decrease in required drive torque, the required drive torque being a function of vehicle speed and accelerator position; and
a control unit configured to start the engine when a required engine output value exceeds a start threshold for starting the engine, wherein
the control unit is configured to (i) set the start threshold at a first threshold value when the required drive torque is relatively high and (ii) set the start threshold at a second threshold value that is higher than the first threshold value when the required drive torque is relatively low.

9. The hybrid vehicle according to claim 8, further comprising
an electric power storage device supplying an electric power to the motor; and
a charging port for charging the electric power storage device from an outside of the vehicle.

10. The hybrid vehicle according to claim 8, further comprising
a vehicle speed sensor that senses a vehicle speed, wherein the control unit decreases the start threshold in accordance with a decrease in the sensed vehicle speed.

11. The hybrid vehicle according to claim 8, wherein
the control unit changes the start threshold in accordance with a quantity of residual electricity in an electric power storage device mounted on the hybrid vehicle.

12. The hybrid vehicle according to claim 8, wherein
the control unit calculates a required drive output based on a vehicle speed and the required drive torque, and calculates the required engine output value based on the required drive output and a quantity of residual electricity in an electric power storage device mounted on the hybrid vehicle.

13. The hybrid vehicle according to claim 8, wherein
the control unit determines a reference value of the start threshold based on a vehicle speed, and calculates the start threshold by adding, to the reference value, a value obtained by multiplying an increment determined based on a quantity of residual electricity in an electric power storage device mounted on the hybrid vehicle by a reduction rate determined based on a vehicle speed and the required drive torque.

14. The hybrid vehicle according to claim 8, wherein
the hybrid vehicle has, as operation modes, an IIV mode for controlling charge and discharge with respect to an electric power storage device such that a quantity of residual electricity in the electric power storage device stays within a predetermined range of a target value, and an EV mode for causing the electric power storage device to perform primarily the discharge without setting the target value of a quantity of stored electricity,
the control unit determines the operation mode based on the quantity of the residual electricity in the electric power storage device, and
the control unit uses a reference value as the start threshold in the HV mode and uses in the EV mode a value obtained by adding a value that decreases with increase in the required drive torque to the reference value as the start threshold.

15. The hybrid vehicle according to claim 14, wherein
the control unit controls, in the HV mode, charge and discharge with respect to the electric power storage device to keep the quantity of the residual electricity within a range between predetermined maximum and minimum values, and
the control unit changes the operation mode from the EV mode to the HV mode when the quantity of the residual electricity becomes smaller than a predetermined value.

* * * * *